US010440674B2

(12) United States Patent
Lau et al.

(10) Patent No.: US 10,440,674 B2
(45) Date of Patent: Oct. 8, 2019

(54) SYSTEMS AND METHODS FOR AUTOMATIC INTERWORKING FUNCTION DEVICE RECOVERY

(71) Applicant: Verizon Patent and Licensing Inc., Arlington, VA (US)

(72) Inventors: Priscilla Lau, Fremont, CA (US); Suzann Hua, Walnut Creek, CA (US); Ye Huang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 189 days.

(21) Appl. No.: 15/383,129

(22) Filed: Dec. 19, 2016

(65) Prior Publication Data
US 2018/0176854 A1 Jun. 21, 2018

(51) Int. Cl.
| | |
|---|---|
| *H04W 60/04* | (2009.01) |
| *H04L 12/58* | (2006.01) |
| *H04W 4/14* | (2009.01) |
| *H04W 60/06* | (2009.01) |
| *H04L 12/707* | (2013.01) |
| *H04W 88/16* | (2009.01) |
| *H04L 12/26* | (2006.01) |

(52) U.S. Cl.
CPC .......... *H04W 60/04* (2013.01); *H04L 51/04* (2013.01); *H04L 51/08* (2013.01); *H04W 4/14* (2013.01); *H04W 60/06* (2013.01); *H04L 45/22* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2011/0021216 A1* | 1/2011 | Pudney | H04W 4/12 455/466 |
| 2013/0083653 A1* | 4/2013 | Jain | H04W 4/70 370/230 |

OTHER PUBLICATIONS

Wikipedia, "Inter-working function," https://en.wikipedia.org/wiki/Inter-working_function, May 19, 2016, 1 page.

* cited by examiner

Primary Examiner — Jason E Mattis
Assistant Examiner — Hong Shao (57) ABSTRACT

A device may receive a message en route to a recipient device. The device may provide the message to a first interworking function device associated with the recipient device. The device may determine that the first interworking function device is unavailable to route the message to the recipient device. The device may identify a second interworking function device that is capable of routing the message to the recipient device based on determining that the first interworking function device is unavailable to route the message to the recipient device. The first interworking function device and the second interworking function device may act as gateways between a circuit-switched network and a packet-switched network. The device may provide the message to the second interworking function device for routing to the recipient device.

20 Claims, 8 Drawing Sheets

SYSTEMS AND METHODS FOR AUTOMATIC INTERWORKING FUNCTION DEVICE RECOVERY

BACKGROUND

Circuit switching is a method of implementing a telecommunications network in which two network nodes establish a dedicated communications channel (e.g., circuit) through the network before the nodes may communicate. Packet switching is a digital networking communications method that groups all transmitted data into suitably sized blocks, called packets, which are transmitted via a medium that may be shared by multiple simultaneous communication sessions.

Second generation (2G) wireless technology uses circuit-switched networks and does not support packet switching. Third generation (3G) wireless technology uses a combination of circuit-switched networks and packet-switched networks. Fourth generation (4G) wireless technology and the Long Term Evolution (LTE) standard use packet-switched networks and do not use circuit-switched networks.

DETAILED DESCRIPTION OF PREFERRED EMBODIMENTS

The following detailed description of example implementations refers to the accompanying drawings. The same reference numbers in different drawings may identify the same or similar elements.

A recipient device (e.g., a user equipment (UE), a machine-to-machine communication (M2M) device, a machine type communication (MTC) device, an Internet of Things (IoT) device, etc.) may connect to a wireless network, and may receive messages (e.g., short message service (SMS) messages, multimedia message service (MMS) messages, short form messages, Real Time messages, etc.) via the wireless network. In some cases, the recipient device may attach to a circuit-switched wireless network and a packet-switched wireless network. For example, the recipient device may use a circuit-switched network in a low-power state, such as a sleep state, and may use a packet-switched network when in an active state or for data bursts. This may be useful for recipient devices with long battery life requirements.

When the recipient device attaches to both a circuit-switched network and a packet-switched network, a mobility management entity (MME) may select a particular interworking function (IWF) device to function as a serving mobile switching center (MSC) for messages en route to the recipient device. The IWF device may act as a gateway to enable 2G and 3G network elements to connect and communicate with 4G LTE network elements, such as between Mobile Application Part (MAP)-based and Diameter-based interfaces.

In this case, each MME may interface with two or more IWF devices, and may select one of the IWF devices to serve as a serving MSC of the recipient device. When an originating device transmits a message to the recipient device, a message device associated with the originating device (e.g., an SMS Center (SMSC) associated with the originating device) may provide the message to the IWF device associated with the recipient device, and the IWF device may provide the message to the MME for delivery to the recipient device.

If the IWF device assigned to the recipient device fails or is otherwise unavailable, the message center may be unable to route the message to the recipient device via the IWF device. This may be problematic for M2M/MTC/IoT devices, which use messages as triggers to awaken from a sleep state and/or to respond to such triggers. For example, it may be time-consuming to wait for the network to identify the issue on the originating device side and provision a different IWF device appropriately.

Implementations described herein provide for automatic recovery from unavailability of an IWF device. When a message device determines that an IWF device has failed to deliver a message to the appropriate MME for delivery to the recipient device, the message device may identify another IWF device that interfaces with the MME, and may provide the message to the other IWF device. The other IWF device may provide the message to the MME, and the MME may deliver the message.

Additionally, or alternatively, the MME may transmit an instruction to cause the recipient device to detach and reattach with regard to the network, so the recipient device is provisioned to a working IWF device. This may cause other recipient devices associated with the unavailable IWF device to detach and reattach as well. In this case, the message can be provided to the MME/recipient device before the reattachment process, during the reattachment process, or after the reattachment process.

In this way, implementations described herein improve resilience of the wireless network. Furthermore, by reattaching recipient devices associated with the unavailable IWF device (e.g., the recipient of the SMS message and/or other devices), the impact of the unavailability of the IWF device is reduced. This may be especially beneficial when several M2M/IoT/MTC devices in a particular area are associated with a particular IWF device, and may reduce impact of unavailability of the IWF device on the M2M/IoT/MTC devices.

Figure 1A:
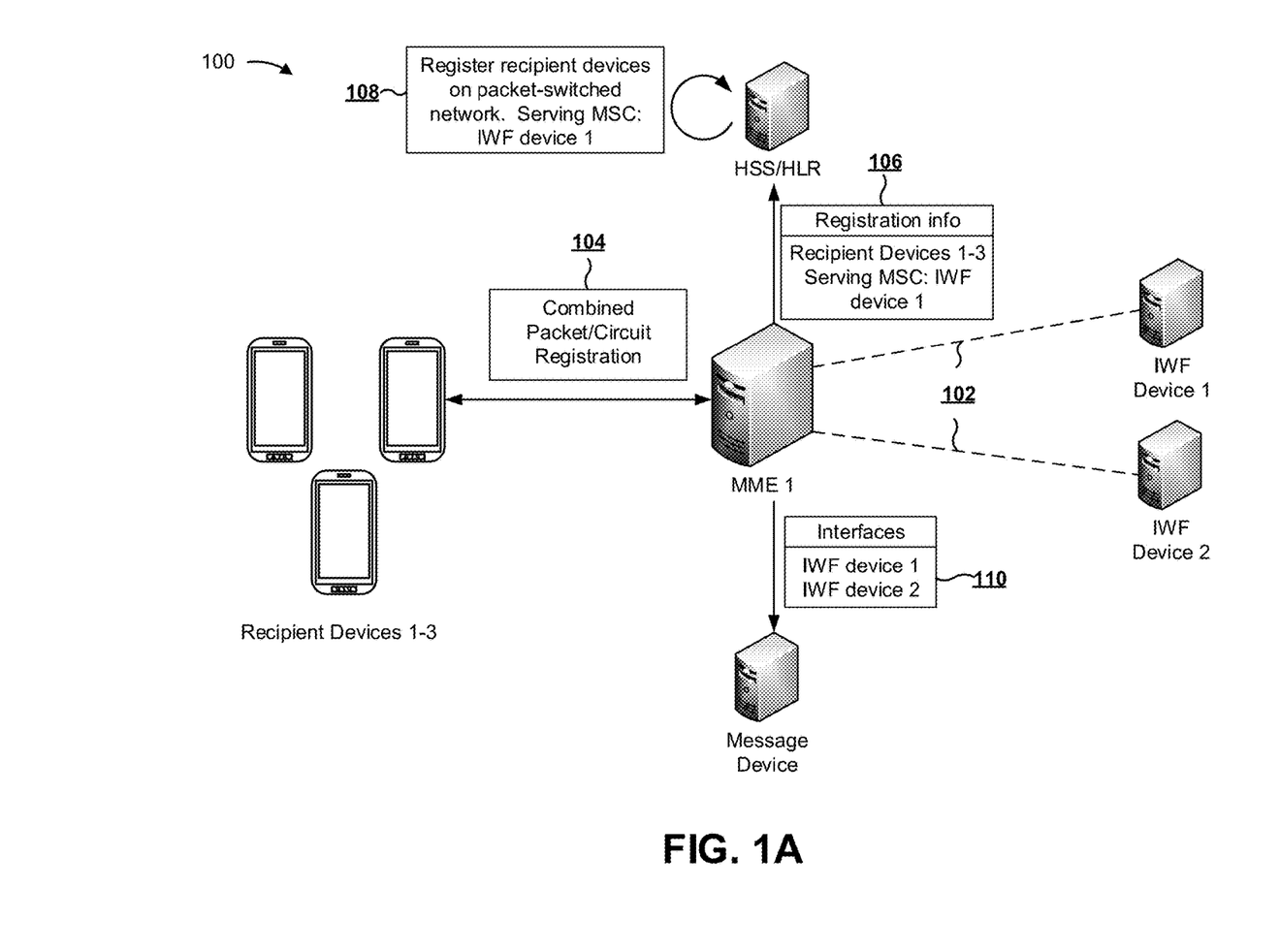
FIGS. 1A-1C are diagrams of an overview of an example implementation described herein.
Figure 1B:
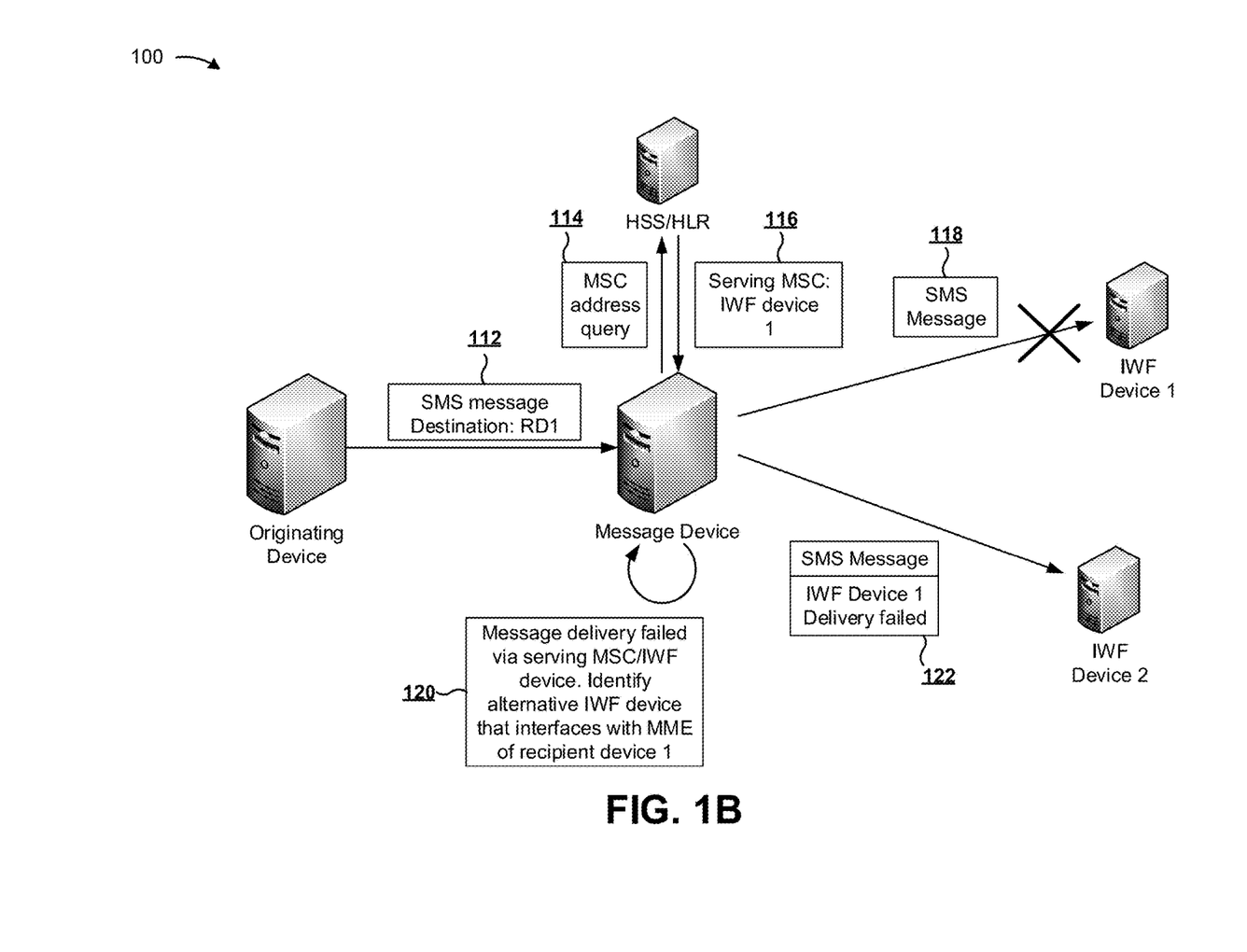
Figure 1C:
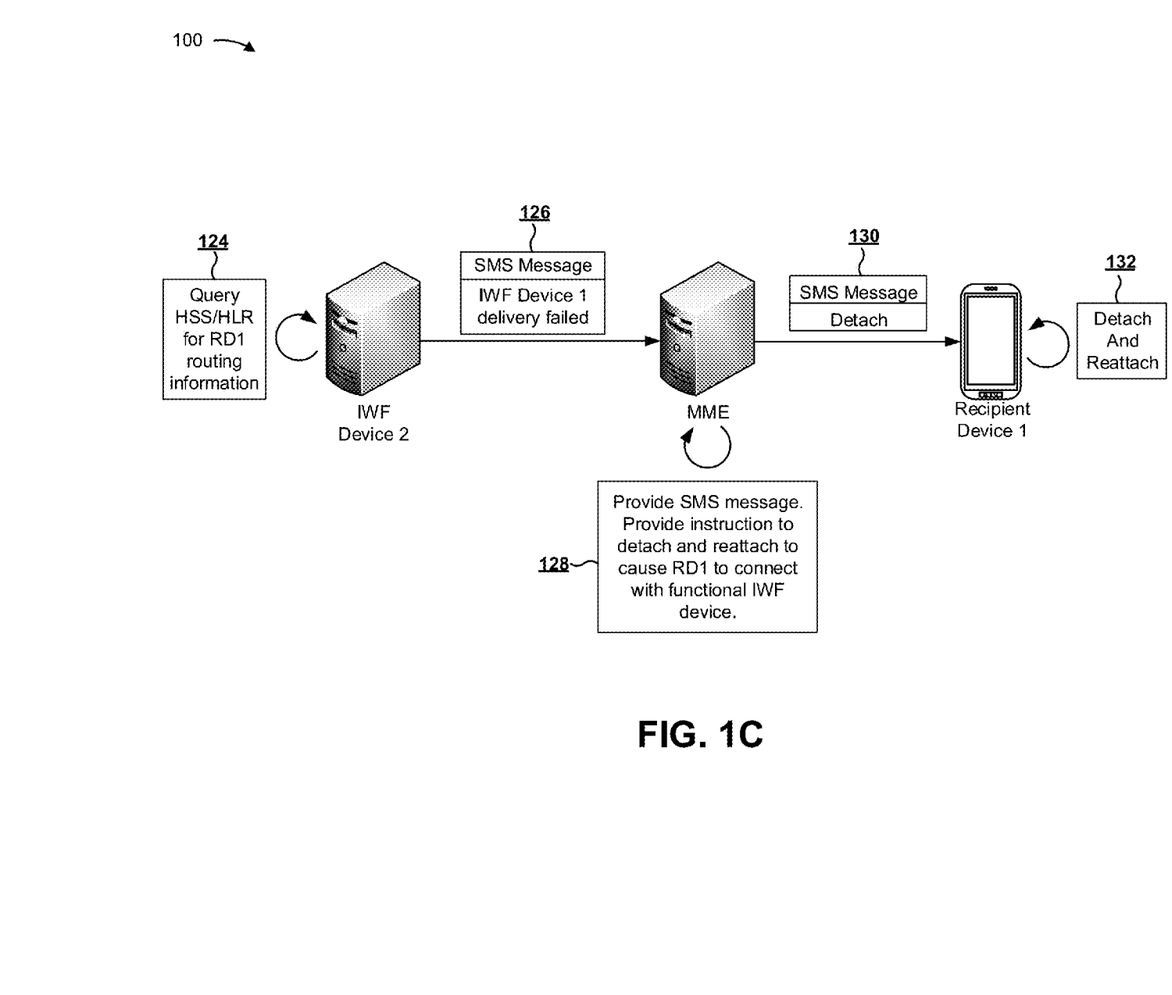

FIGS. 1A-1C are diagrams of an overview of an example implementation 100 described herein. As shown in FIG. 1A, example implementation 100 may include a message device, an MME, IWF devices 1 and 2, a home subscriber server (HSS)/home location register (HLR), and a set of recipient devices 1-3. The recipient devices may include a UE, an M2M device, an MTC device, an IoT device, or the like.

As shown by reference number 102, the MME may be associated with multiple, different IWF devices. For example, the MME may communicate with each of the multiple, different IWF devices via respective interfaces, such as an SGs interface or a similar interface. As shown by reference number 104, a set of recipient devices may provide information regarding a combined packet/circuit registration process to the MME. The information regarding the combined packet/circuit registration process may indicate to register or attach the recipient devices with regard to a circuit-switched network and a packet-switched network associated with the MME. For example, the information regarding the combined packet/circuit registration may include registration information, such as device identifiers of the recipient devices, location information associated with the recipient devices, communication protocols associated with the recipient devices, or the like.

As shown by reference number 106, the MME may provide registration information to the HSS/HLR. The registration information may include information for registering recipient devices with regard to a packet-switched network (e.g., network addresses, device identifiers, communication protocols, etc.) and with regard to a circuit-switched network (e.g., device identifiers, network addresses, communication protocols, etc.). For example, the MME may provide the information regarding the combined packet/circuit registration as the registration information, or may determine information to provide as the registration information (e.g., location information, a serving MSC to be assigned to recipient devices 1-3, etc.). As shown, the registration information may identify a serving MSC for recipient devices 1-3 as IWF device 1. For example, the MME may assign IWF device 1 as a serving MSC for recipient devices 1-3 based on a location associated with IWF device 1, based on availability or load associated with IWF device 1 and/or IWF device 2, or the like.

As shown by reference number 108, the HSS/HLR may register the recipient devices on the packet-switched network, and may store information identifying IWF device 1 as serving MSC for the recipient devices. As shown by reference number 110, the MME may provide, to the message device, information identifying IWF devices that are associated with the MME. The information identifying the IWF devices may be used to reroute SMS messages via an available IWF when another IWF associated with the MME becomes unavailable (e.g., fails, is offline, is in a rebooting state, etc.).

As shown in FIG. 1B, example implementation 100 may further include an originating device. As shown by reference number 112, the originating device may provide an SMS message to the message device. As further shown, the SMS message may identify a destination of the SMS message (e.g., RD1, corresponding to recipient device 1). As shown by reference numbers 114 and 116, the message device may identify a serving MSC to route the SMS message to recipient device 1 (e.g., an IWF device associated with recipient device 1) based on querying the HSS/HLR. For example, the message device may provide an MSC address query 114 to the HSS/HLR and may receive a network address of IWF device 1, as shown by reference number 116.

As shown by reference number 118, the message device may provide an SMS message to IWF device 1 for routing to recipient device 1, and may determine that IWF device 1 is unavailable (e.g., based on detecting a timeout of an acknowledgement message from IWF device 1). As shown by reference number 120, the message device may thereby identify an alternative IWF device (e.g., IWF device 2) that interfaces with the MME of recipient device 1. As shown by reference number 122, the message device may provide the SMS message to IWF device 2 for routing to recipient device 1. In some implementations, the message device may also provide information indicating that delivery to IWF device 1 failed.

As shown in FIG. 1C, and as shown by reference number 124, IWF device 2 may query the HSS/HLR to obtain routing information for recipient device 1 (e.g., to identify a device identifier and/or network address of recipient device 1). For example, IWF device 2 may not store routing information for recipient device 1, since IWF device 2 is not a serving MSC of recipient device 2. Therefore, IWF device 2 may obtain the routing information from the HSS/HLR. As shown by reference number 126, IWF device 2 may provide the SMS message to the MME for routing to recipient device 1 based on the routing information. As further shown, IWF device 2 may provide information indicating that delivery to IWF device 1 has failed. For example, IWF device 2 may receive information indicating that delivery to IWF device 1 has failed (e.g., from the message device). Additionally, or alternatively, IWF device 2 may determine that delivery to IWF device 1 has failed based on receiving a message en route to recipient device 1 despite IWF device 2 not being assigned as a serving MSC of recipient device 1.

As shown by reference number 128, the MME may provide the SMS message to recipient device 1, and may generate an instruction to cause recipient device 1 to detach from and reattach to the network (e.g., the circuit-switched network and/or the packet-switched network). By causing recipient device 1 to detach from and reattach to the network, the MME may cause recipient device 1 to be assigned an available IWF device as a serving MSC. As shown by reference number 130, the MME may provide the SMS message and a detach instruction to recipient device 1. As shown by reference number 132, recipient device 1 may detach from and reattach to the network based on the detach instruction.

After recipient device 1 detaches from and reattaches to the network, the MME may receive information regarding a combined packet/circuit registration from recipient device 1, and may select an available IWF device, of IWF devices 1 and 2, to be assigned as a serving MSC of recipient device 1. In this way, recipient device 1 receives the SMS message via IWF device 2 when IWF device 1 is unavailable, and recipient device 1 is assigned an available IWF device as part of the detachment and reattachment process. Thus, network resilience is improved and delay, associated with providing SMS messages when an assigned IWF device is unavailable, is reduced.

While FIGS. 1A-1C above and FIGS. 4-6 below are described in the context of SMS messages, implementations described herein are equally applicable for other cellular network messaging formats, such as MMS messages, short form messages, Real Time messages, or the like.

As indicated above, FIGS. 1A-1C are provided merely as an example. Other examples are possible and may differ from what was described with regard to FIGS. 1A-1C.

Figure 2:
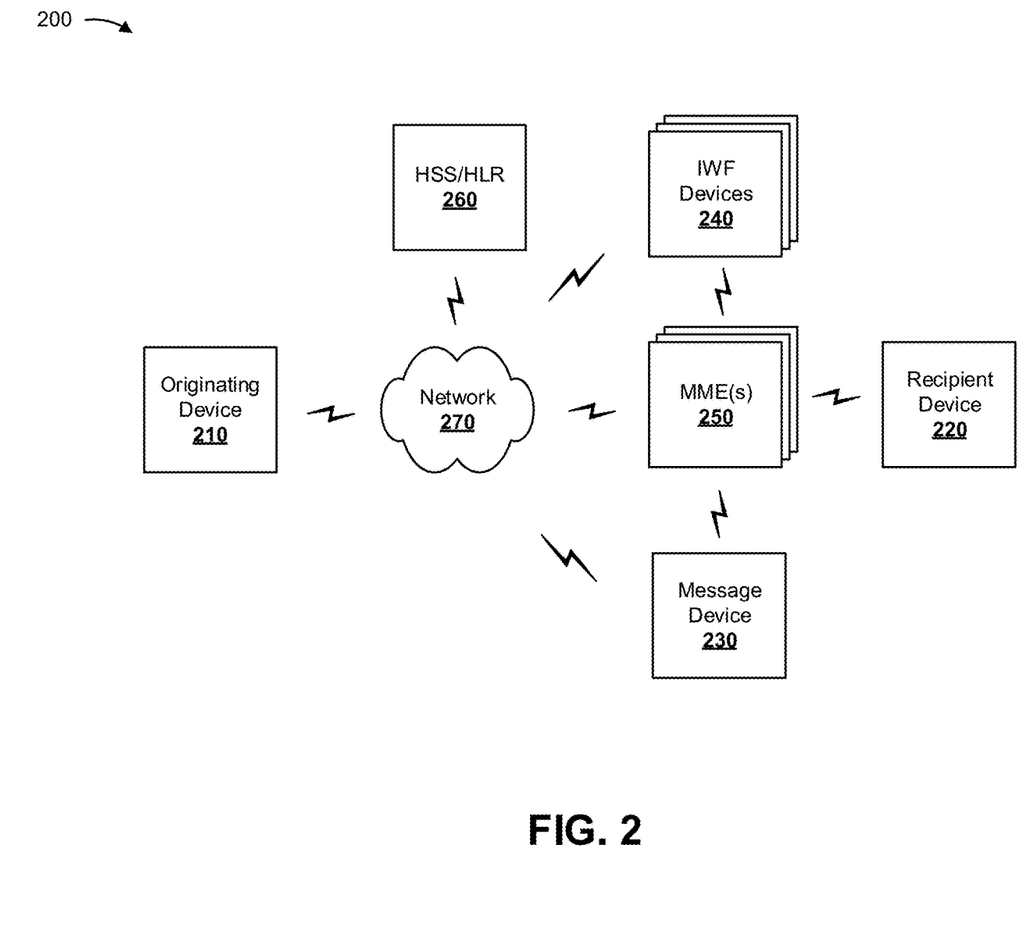
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an originating device 210, a recipient device 220, a message device 230, two or more IWF device(s) 240, one or more MME(s) 250, an HSS/HLR 260, and a network 270. Devices of environment 200 may interconnect via wired connections, wireless connections, or a combination of wired and wireless connections.

Originating device 210 includes one or more devices capable of receiving, generating, storing, processing, and/or providing messages. For example, originating device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Recipient device 220 includes one or more devices capable of receiving, generating, storing, processing, and/or providing messages. For example, recipient device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), an M2M device, an IoT device, an MTC device, or a similar type of device.

Message device 230 includes a device (e.g., a cellular network device) that receives, stores, processes, routes, and/or provides messages en route to or from originating device 210 or recipient device 220. For example, message device 230 may include a server, a group of servers, an SMS center (SMSC), a gateway, a router, an over-the-top (OTT) messaging server, an IMS application processor, or the like. As described herein, different recipient devices 220 may be associated with different message devices 230. For example, one message device 230 may serve recipient devices 220 located in a first geographical area, and another message device 230 may serve recipient devices 220 located in a second geographical area.

IWF device 240 includes one or more devices capable of acting as a gateway to enable circuit-switched network elements (e.g., 2G and 3G network elements) to connect and communicate with packet-switched network elements (e.g., 3G and 4G LTE network elements), such as between MAP-based and Diameter-based interfaces. For example, IWF device 240 may include hardware and/or software components that provide interworking between different types of networks, protocol conversion and/or mediation, or the like. In some implementations, IWF device 240 may be referred to as a Diameter gateway or as an intermediate device.

MME 250 includes one or more devices, such as one or more server devices, capable of managing authentication, activation, deactivation, and/or mobility functions associated with recipient device 220. In some implementations, MME 250 may perform operations relating to authentication of recipient device 220. Additionally, or alternatively, MME 250 may facilitate the selection of a particular IWF device 240 and/or a particular message device 230 to serve traffic to and/or from recipient device 220.

HSS/HLR 260 includes one or more devices, such as one or more server devices, capable of managing (e.g., receiving, generating, storing, processing, and/or providing) information associated with recipient device 220. For example, HSS/HLR 260 may manage subscription information associated with recipient device 220, such as information that identifies a subscriber profile of a user associated with recipient device 220, information that identifies services and/or applications that are accessible to recipient device 220, location information associated with recipient device 220, a network identifier (e.g., a network address) that identifies recipient device 220, information that identifies a treatment of recipient device 220 (e.g., quality of service information, a quantity of minutes allowed per time period, a quantity of data consumption allowed per time period, etc.), and/or similar information. HSS/HLR 260 may provide this information to one or more other devices of environment 200 to support the operations performed by those devices.

Network 270 includes one or more wired and/or wireless networks. For example, network 270 may include a cellular network (e.g., a long-term evolution (LTE) network, an LTE-Advanced (LTE-A or LTE+) network, a code division multiple access (CDMA) network, a 2G network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
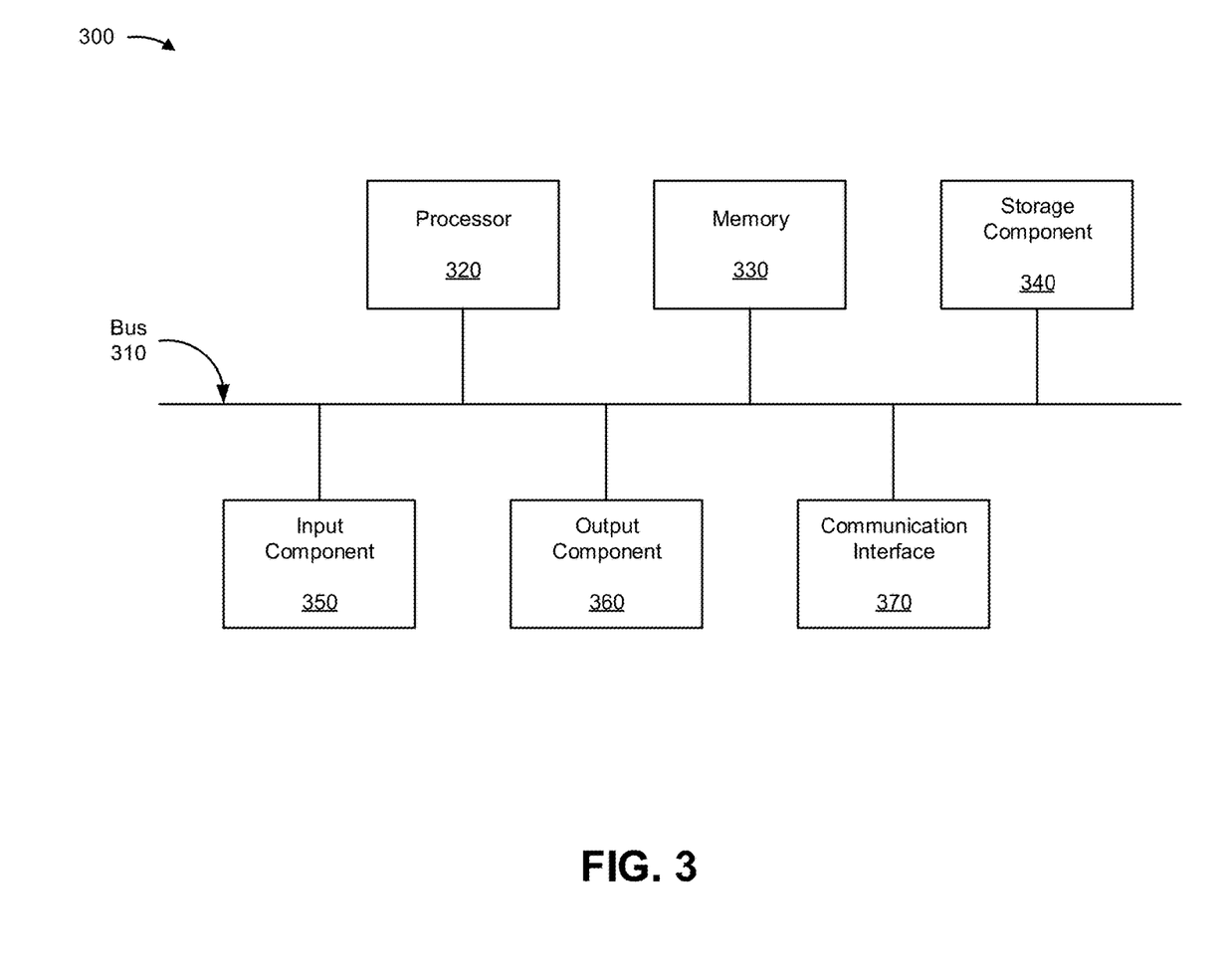
FIG. 3 is a diagram of example components of one or more devices of FIG. 2.

FIG. 3 is a diagram of example components of a device 300. Device 300 may correspond to originating device 210, recipient device 220, message device 230, IWF device 240, MME 250, and/or HSS/HLR 260. In some implementations, originating device 210, recipient device 220, message device 230, IWF device 240, MME 250, and/or HSS/HLR 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
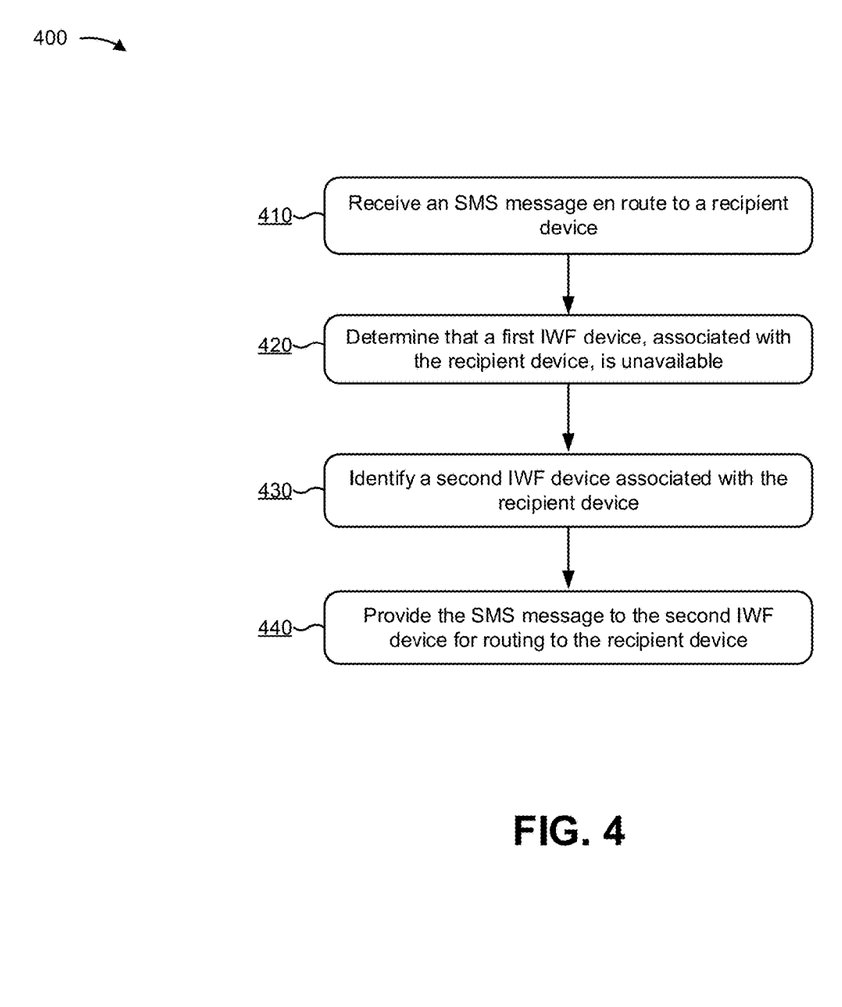
FIG. 4 is a flow chart of an example process for routing a message to a recipient device when an interworking function device associated with the recipient device is unavailable.

FIG. 4 is a flow chart of an example process 400 for routing a message to a recipient device when an interworking function device associated with the recipient device is unavailable. In some implementations, one or more process blocks of FIG. 4 may be performed by message device 230. In some implementations, one or more process blocks of FIG. 4 may be performed by another device or a group of devices separate from or including message device 230, such as originating device 210, recipient device 220, IWF device 240, MME 250, and/or HSS/HLR 260.

As shown in FIG. 4, process 400 may include receiving an SMS message en route to a recipient device (block 410). For example, message device 230 may receive an SMS message from originating device 210 en route to recipient device 220. In some implementations, message device 230 may receive the SMS message via one or more base stations, an SMPP gateway, or the like. In some implementations, the SMS message may include control information for an M2M/IoT/MTC device. For example, the SMS message may include configuration information, an instruction to enter an awake state, or the like. Additionally, or alternatively, the SMS message may include any other content to be provided via a cellular network, such as textual content, media content, multimedia content, or the like.

In some implementations, message device 230 may receive the SMS message to route the SMS message to recipient device 220 via IWF device 240 and an MME 250 associated with recipient device 220. For example, when recipient device 220 is attached to a circuit-switched network and a packet-switched network, recipient device 220 may be associated with an assigned IWF device 240 to act as a serving MSC of recipient device 220. In this case, the assigned IWF device 240 may be assigned by MME 250 during attachment of recipient device 220 to the circuit-switched network.

In some implementations, message device 230 may identify an IWF device 240 associated with recipient device 220 based on querying HSS/HLR 260 for routing information associated with recipient device 220. HSS/HLR 260 may store information identifying recipient devices 220 and corresponding IWF devices 240 to act as serving MSCs for the recipient devices 220 (e.g., as part of circuit-switched network attachment process). For example, message device 230 may transmit an MSC network address query, and may receive the routing information as an MSC network address response that identifies a network address of IWF device 240.

As further shown in FIG. 4, process 400 may include determining that a first IWF device, associated with the recipient device, is unavailable (block 420). For example, message device 230 may determine that a first IWF device 240, that acts as a serving MSC of recipient device 220, is unavailable. For example, message device 230 may determine that the first IWF device 240 is unavailable if the first IWF device 240 is offline, has failed, is overloaded, is unavailable to route the SMS message, is in a state of rebooting, or the like. In some implementations, message device 230 may determine that the first IWF device 240 is unavailable based on providing the SMS message to the first IWF device 240, and by failing to receive an acknowledgement (e.g., an ACK) from the first IWF device 240 within a particular time period (e.g., within a timeout period).

As further shown in FIG. 4, process 400 may include identifying a second IWF device associated with the recipient device (block 430). For example, message device 230 may identify a second IWF device associated with the recipient device. In some implementations, the first IWF device 240 (i.e., the unavailable IWF device 240) may be one of a set of IWF devices 240 associated with MME 250 corresponding to recipient device 220. In this case, message device 230 may identify a second IWF device 240, of the set of IWF devices 240, that is associated with MME 250. For example, message device 230 may store information identifying the set of IWF devices 240 as associated with MME 250, and may identify the second IWF device 240 according to the stored information (e.g., based on availability of the second IWF device 240, a location of the second IWF device 240, etc.). In this case, the information identifying the set of IWF devices 240 may be provided as part of an attachment process of recipient device 220, as described elsewhere herein.

In some implementations, message device 230 may select an IWF device 240 from a plurality of IWF devices 240 associated with MME 250. For example, message device 230 may determine which IWF devices 240 are available, and may select an available IWF device 240. Additionally, or alternatively, message device 230 may determine locations of the IWF devices 240, and may select IWF device 240 based on the locations (e.g., based on an IWF device 240 associated with a location of recipient device 220). Additionally, or alternatively, message device 230 may determine load on IWF devices 240, and may select IWF device 240 based on the load (e.g., may select an IWF device 240 with a lowest load). Additionally, or alternatively, message device 230 may determine how many recipients are assigned to each of the plurality of IWF devices 240, and may select IWF device 240 based on how many recipients are assigned to each of the plurality of IWF devices 240. Additionally, or alternatively, message device 230 may use some combination of the above rules to select IWF device 240. For example, message device 230 may generate a score based on one or more of the above rules, and may select IWF device 240 based on the score. Additionally, or alternatively, message device 230 may randomly select IWF device 240 from the plurality of IWF devices 240. In some implementations, message device 230 may obtain the above information for selecting IWF device 240 from MME 250. Additionally, or alternatively, message device 230 may obtain the above information from the plurality of IWF devices 240, or from another device.

In some implementations, message device 230 may identify the second IWF device 240 based on a network detach and reattach process before the SMS message is provided to recipient device 220. For example, in some cases, MME 250 or another device may cause recipient device 220 to detach and reattach before providing the SMS message to recipient device 220. In this case, message device 230 may identify the second IWF device 240 based on having received information indicating that the second IWF device 240 is associated with recipient device 220. For example, the information may include a location update that is transmitted as part of an attachment procedure for recipient device 220.

In some implementations, message device 230 may determine that the second IWF device 240 is unavailable, and may thereby identify a third IWF device 240 to route the message to recipient device 220. For example, message device 230 may identify the third IWF device 240 from a plurality of available IWF devices 240 based on the above rules, and may provide the message to the third IWF device 240 for routing to recipient device 220. In this way, message device 230 improves resilience of the network by selecting an available IWF device 240 to route messages in the event of unavailability of multiple IWF devices 240.

As further shown in FIG. 4, process 400 may include providing the SMS message to the second IWF device for routing to the recipient device (block 440). For example, message device 230 may provide the SMS message to the second IWF device 240 for routing to recipient device 220 via MME 250 associated with the first and second IWF devices 240. In this case, the second IWF device 240 may provide the SMS message to MME 250 (e.g., via an interface such as an SGs interface), and MME 250 may provide the SMS message to recipient device 220 (e.g., via an air interface and a base station).

In some implementations, message device 230 may provide the SMS message after recipient device 220 has detached from and reattached to the network. For example, message device 230 may provide the SMS message to the second IWF device 240 that is assigned as a serving MSC of recipient device 220. This may conserve messaging and processor resources of the second IWF device 240 that would otherwise be used to determine that the second IWF device 240 is not a serving MSC of recipient device 220, and to obtain routing information to route the SMS message to recipient device 220.

In some implementations, message device 230 may provide the SMS message before recipient device 220 has detached from and reattached to the network. For example, message device 230 may provide the SMS message to the second IWF device 240. In some implementations, the second IWF device 240 may determine that the second IWF device 240 is not assigned as a serving MSC of recipient device 220 (e.g., based on determining that a visitor location register (VLR) of the second IWF device 240 does not identify recipient device 220). In this case, the second IWF device 240 may obtain routing information for recipient device 220 based on determining that recipient device 220 is not associated with the second IWF device 240. For example, the second IWF device 240 may query HSS/HLR 260 to identify MME 250 and a device identifier of recipient device 220. In this case, the second IWF device 240 may provide the SMS message to MME 250 for routing to recipient device 220 based on the device identifier.

In some implementations, when MME 250 receives the SMS message from the second IWF device 240, MME 250 may determine that recipient device 220 is not associated with the second IWF device 240, and may set a flag indicating that the VLR is not reliable with regard to recipient device 220. The flag may cause MME 250 or another device (e.g., message device 230) to provide a detach instruction to recipient device 220 indicating that recipient device 220 is to perform a network detach and reattach. Based on the flag, MME 250 may provide a detach instruction to recipient device 220. The detach instruction may cause recipient device 220 to detach and reattach from the circuit-switched and/or packet-switched network. For example, the detach instruction may cause recipient device 220 to perform a tracking area update (TAU) procedure.

Continuing with the above example, as part of the TAU procedure, recipient device 220 may provide information identifying a location of recipient device 220 to MME 250. In this case, MME 250 may use this information to identify an available IWF device 240 (e.g., the second IWF device 240 or another IWF device 240) to be assigned to recipient device 220 as a serving MSC. In some implementations, MME 250 may identify the available IWF device 240 based on other information (e.g., availability, load, a quantity of assigned recipient devices 220, etc.). In some implementations, MME 250 may provide a location update message to HSS/HLR 260 identifying the assigned IWF device 240, and HSS/HLR 260 may update routing information for recipient device 220 so that SMS messages are routed to recipient device 220 via the assigned IWF device 240. In this way, recipient device 220 is reassigned to an available IWF device 240 when a message is undeliverable to recipient device 220 via an unavailable IWF device 240.

In some implementations, MME 250 or message device 230 may provide a detach instruction for multiple, different recipient devices 220. For example, MME 250 or message device 230 may provide a detach instruction for each recipient device 220 associated with the first IWF device 240. In this way, each recipient device 220 is reconfigured to be associated with an available IWF device 240, thus reducing dropped SMS messages and delay in delivery of SMS messages.

In this way, implementations described herein improve resilience of the wireless network, and reduce delay caused by rerouting SMS messages based on reconfiguration on the originating device side. Furthermore, by reattaching recipient devices associated with the IWF device (e.g., the recipient of the SMS message and/or other devices), the impact of unavailability of the IWF device is reduced. This may be especially beneficial when several M2M/IoT/MTC devices in a particular area are associated with a particular IWF device, and may reduce impact unavailability of that particular IWF device on the M2M/IoT/MTC devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
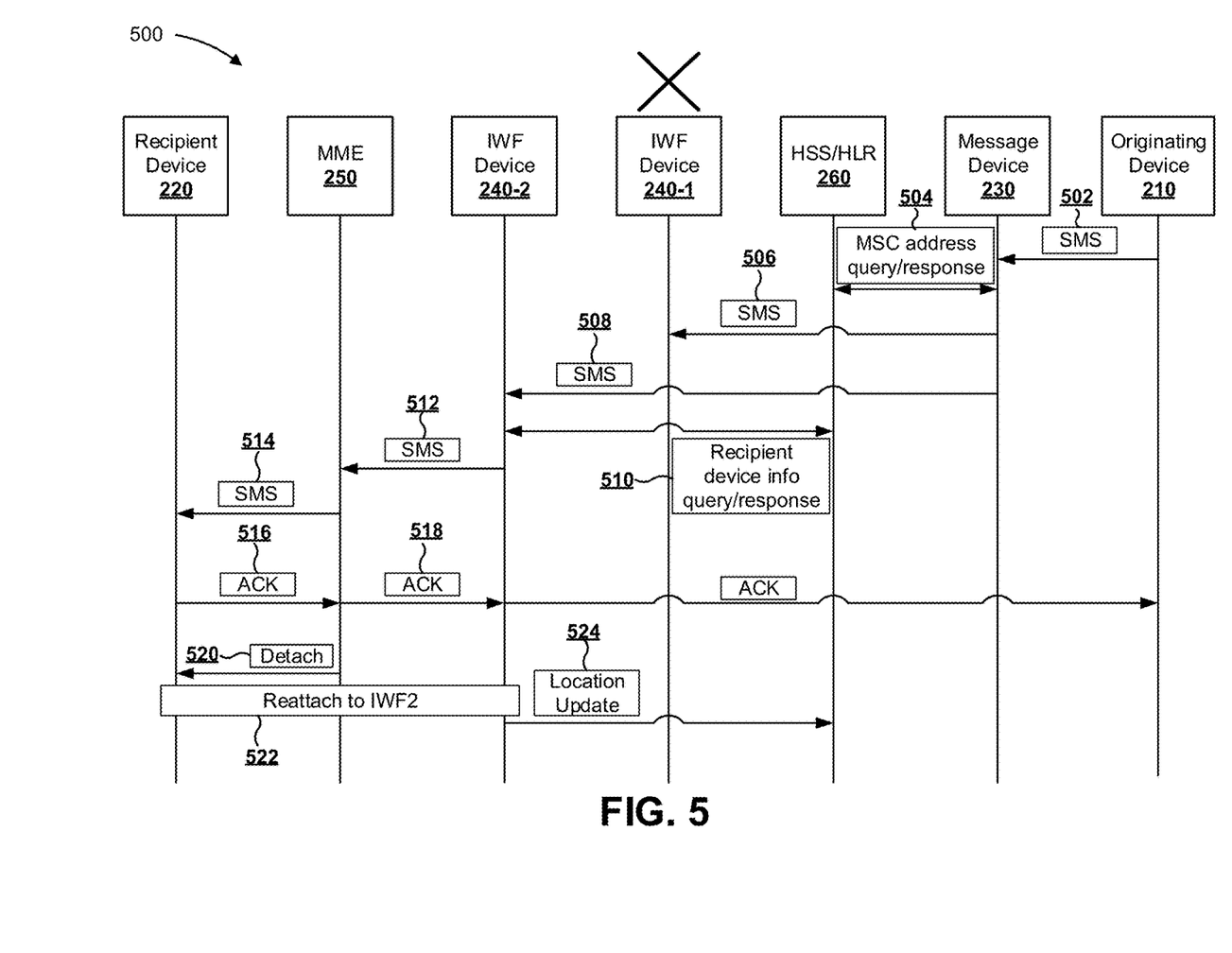
FIG. 5 is a diagram of an example implementation relating to the example process shown in FIG. 4.

FIG. 5 is a call flow diagram of an example call flow 500 for routing a message to a recipient device when an interworking function device associated with the recipient device is unavailable. FIG. 5 shows an example where detachment and reattachment of recipient device 220 occurs after an SMS message is routed to recipient device 220 via IWF device 240-2.

As shown in FIG. 5, and as shown by reference number 502, originating device 210 transmits an SMS message to message device 230. As shown by reference number 504, message device 230 and HSS/HLR 260 exchange an MSC address query and response based on receiving the message. In some implementations, the MSC address query and response may include a Mobile Application Part-C interface (MAP-C) Send Routing Information (SRI) request.

As shown by reference number 506, message device 230 may provide the SMS message to IWF device 240-1 (e.g., based on an MSC address of IWF device 240-1). In some implementations, message device 230 may provide the SMS message as part of a MAP-E interface mobile-terminating forward short message (MAP-E MT Fwd SM) message. Assume that delivery of the SMS message via IWF device 240-1 fails, as indicated by the "x" above IWF device 240-1.

As shown by reference number 508, message device 230 may provide the SMS message to IWF device 240-2 based on failure of delivery of the SMS message via IWF device 240-1. In some implementations, message device 230 may provide the SMS message to IWF device 240-2 as part of a MAP-E MT Fwd SM message.

As shown by reference number 510, IWF device 240-2 and HSS/HLR 260 may exchange a recipient device information query/response. In some implementations, the recipient device information query/response may include a user profile data request (UDR) and user profile data acknowledgment (UDA) on an Sh interface to obtain an IMSI of recipient device 220 and a device identifier of MME 250.

As shown by reference number 512, IWF device 240-2 may provide the SMS message to MME 250. For example, IWF device 240-2 may transmit an SGs interface Application Part (SGsAP) paging request to MME 250, and may receive an SGsAP service request from MME 250. Based on the SGsAp service request, IWF device 240-2 may provide the SMS message in an SGsAP downlink unit data message.

As shown by reference number 514, MME 250 may provide the SMS message to recipient device 220. As shown by reference number 516, recipient device 220 may provide an ACK message to MME 250. As shown by reference number 518, MME 250 may provide an ACK message to IWF device 240-2 (e.g., in an SGsAP uplink unit data message), and IWF device 240-2 may provide an ACK to originating device 210 indicating that the SMS message was delivered to recipient device 220 (e.g., in a MAP F-interface MT forward short message (FSM) ACK message).

As shown by reference number 520, MME 250 may provide a detach instruction to recipient device 220 (e.g., based on receiving the SMS message from IWF device 240-2 and not IWF device 240-1). As shown by reference number 522, recipient device 220 may reattach to IWF device 240-2 or another functioning IWF device 240. As shown by reference number 524, IWF device 240-2 may provide a location update to HSS/HLR 260.

As indicated above, FIG. 5 is provided merely as an example. Other examples are possible and may differ from what was described with regard to FIG. 5.

Figure 6:
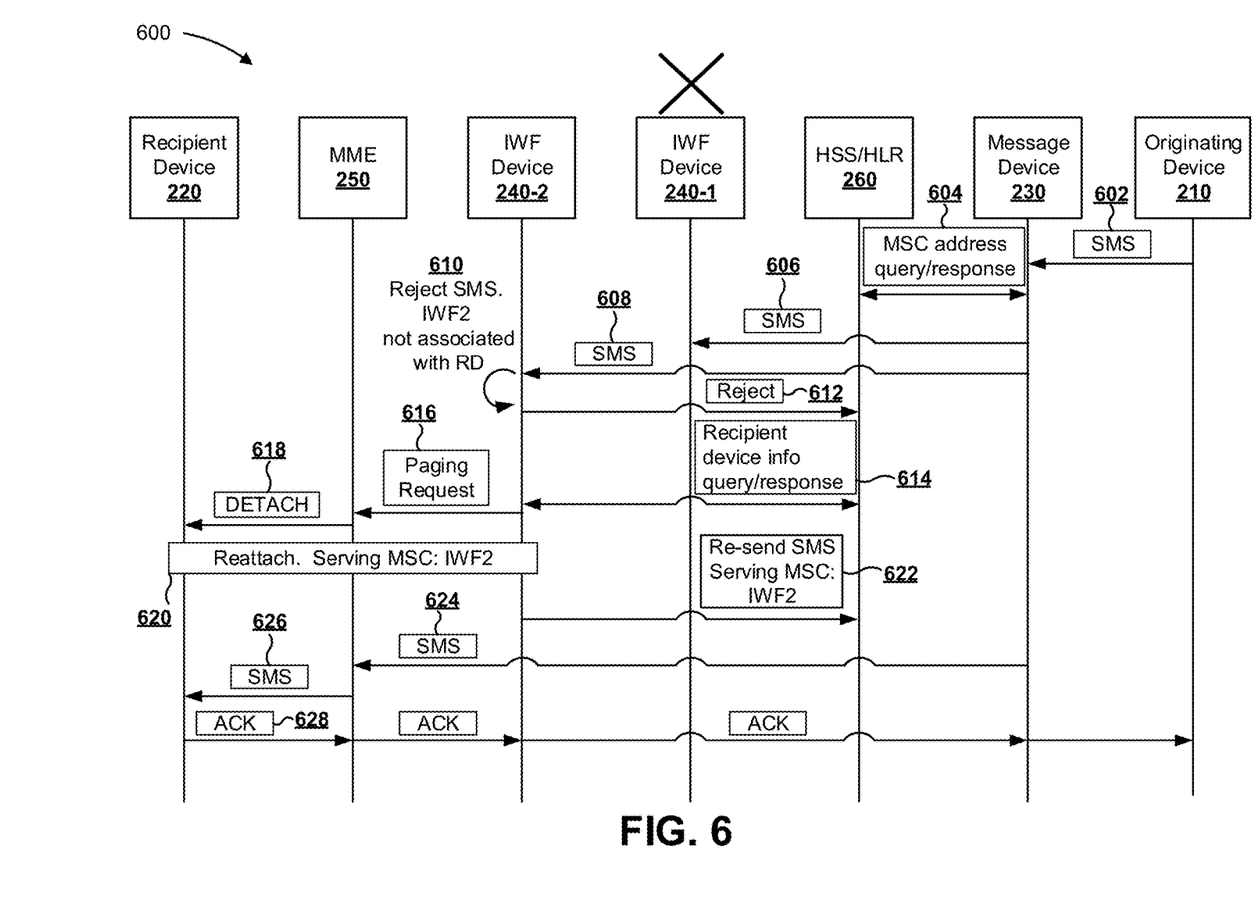
FIG. 6 is a diagram of another example implementation relating to the example process shown in FIG. 4.

FIG. 6 is a call flow diagram of an example call flow 600 for routing a message to a recipient device when an interworking function device associated with the recipient device is unavailable. FIG. 6 shows an example where an SMS message is routed to recipient device 220 via IWF device 240-2 after detachment and reattachment of recipient device 220 to a cellular network.

As shown in FIG. 6, and by reference number 602, originating device 210 may transmit an SMS message to message device 230. As shown by reference number 604, message device 230 and HSS/HLR 260 may exchange an MSC address query and response based on receiving the message. In some implementations, the MSC address query and response may include a MAP-C SRI request.

As shown by reference number 606, message device 230 may provide the SMS message to IWF device 240-1 (e.g., based on an MSC address of IWF device 240-1), and may determine that delivery via IWF device 240-1 has failed. As shown by reference number 608, message device 230 may provide the SMS message to IWF device 240-2. In some implementations, message device 230 may provide the SMS message to IWF device 240-2 as part of a MAP-E MT Fwd SM message.

As shown by reference number 610, IWF device 240-2 may reject the SMS message. In this case, IWF device 240-2 may not be associated with recipient device 220. As shown by reference number 612, IWF device 240-2 transmits a rejection message to HSS/HLR 260. In some implementations, the rejection message may include an error response with regard to a MAP E-interface MT forward SM message transmitted to IWF device 240-2 by message device 230.

As shown by reference number 614, IWF device 240-2 and HSS/HLR 260 may exchange a recipient device information query/response. In some implementations, the recipient device information query/response may include a user profile data request (UDR) and user profile data acknowledgment (UDA) on an Sh interface to obtain an IMSI of recipient device 220 and a device identifier of MME 250.

As shown by reference number 616, IWF device 240-2 may provide a paging request to MME 250 (e.g., a SGsAP paging request, or the like) based on the recipient device information query/response. As shown by reference number 616, MME 250 may provide a detach instruction to recipient device 220 based on the paging request. In some implementations, when recipient device 220 is in an idle state, MME 250 may transmit the paging request to cause recipient device 220 to switch to an active state, and may cause recipient device 220 to detach once in the active state. In some implementations, when recipient device 220 is in the active state without receiving a paging request, MME 250 may cause recipient device 220 to detach without transmitting the paging request. In some implementations, IWF device 240-2 may abort a paging process associated with the paging request. For example, IWF device 240-2 may not provide a downlink SGsAP unit data message, including the SMS message, to recipient device 220. This may permit recipient device 220 to reattach to the cellular network and be provisioned a working IWF device 240 before the SMS message is provided to recipient device 220.

As shown by reference number 620, recipient device 220 may reattach to the cellular network, and may be provisioned IWF device 240-2 as a serving MSC. For example, MME 250 may provide a location update to HSS/HLR 260 indicating that recipient device 220 is associated with IWF device 240-2 as a serving MSC. As shown by reference number 622, IWF device 240-2 may transmit a request to message device 230 to re-send the SMS using IWF device 240-2 as a serving MSC. In some implementations, HSS/HLR 260 may provide a notification to message device 230 indicating that recipient device 220 is associated with IWF device 240-2 (e.g., a MAP-Alert-SC message, or the like). In such a case, message device 230 may request routing information corresponding to recipient device 220 from HSS/HLR 260 (e.g., using a MAP-C SRI SM message), and may transmit the SMS message based on the routing information.

As shown by reference number 624, message device 230 may send the SMS message to MME 250. As shown by reference number 626, MME 250 may send the SMS message to recipient device 220. As shown by reference number 628, recipient device 220 may send an ACK to originating device 210 via MME 250, IWF device 240-2, and/or message device 230.

As indicated above, FIG. 6 is provided merely as an example. Other examples are possible and may differ from what was described with regard to FIG. 6.

In this way, implementations described herein improve resilience of the wireless network, and reduce delay caused by rerouting SMS messages based on reconfiguration on the originating device side. Furthermore, by reattaching recipient devices associated with an unavailable IWF device (e.g., the recipient of the SMS message and/or other devices), the impact of unavailability of the IWF device is reduced. This may be especially beneficial when several M2M/IoT/MTC devices in a particular area are associated with a particular IWF device, and may reduce impact of unavailability of that particular IWF device on the M2M/IoT/MTC devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a message en route to a recipient device;
provide the message to a first interworking function device associated with the recipient device,
the first interworking function device to act as a gateway between a circuit-switched network and a packet-switched network;
determine that the first interworking function device is unavailable to route the message to the recipient device;
identify a second interworking function device that is capable of routing the message to the recipient device based on determining that the first interworking function device is unavailable to route the message to the recipient device,
the second interworking function device to act as the gateway between the circuit-switched network and the packet-switched network;
provide the message to the second interworking function device for routing to the recipient device; and
receive information indicating that a particular interworking function device has been assigned as a serving mobile switching center of the recipient device, where the particular interworking function device is assigned as the serving mobile switching center of the recipient device based on a detachment and reattachment of the recipient device with regard to a network,
the detachment and reattachment having been performed based on the first interworking function device being unavailable to route the message to the recipient device.

2. The device of claim 1, where the one or more processors, when identifying the second interworking function device, are to:
identify the second interworking function device based on information indicating that the first interworking function device and the second interworking function device are both associated with a particular intermediate device,
the message being routed to the recipient device via the particular intermediate device.

3. The device of claim 1, where the one or more processors, when providing the message to the first interworking function device, are to:
provide the message to the first interworking function device based on information indicating that the first interworking function device is the serving mobile switching center of the recipient device.

4. The device of claim 1, where the second interworking function device is the particular interworking function device, and where the one or more processors, when identifying the second interworking function device, are to:
identify the second interworking function device based on information indicating that the second interworking function device has been assigned as the serving mobile switching center of the recipient device,
the second interworking function device to be assigned as the serving mobile switching center of the recipient device based on the first interworking function device being unavailable to route the message to the recipient device.

5. The device of claim 1, where the one or more processors, when receiving the information indicating that the particular interworking function device has been assigned as a serving mobile switching center of the recipient device, are to:
receive the information indicating that the particular interworking function device has been assigned as the serving mobile switching center of the recipient device after the message has been provided to the second interworking function device for delivery.

6. The device of claim 1, where the particular interworking function device is the second interworking function device,
the particular interworking function device having been assigned as the serving mobile switching center of the recipient device before the message is provided to the second interworking function device for delivery.

7. A non-transitory computer-readable medium storing instructions, the instructions comprising:
one or more instructions that, when executed by one or more processors, cause the one or more processors to:
receive a message en route to a recipient device,
provide the message to a first interworking function device, associated with the recipient device, for routing to the recipient device,
the first interworking function device to route the message to the recipient device via an intermediate device, and
the first interworking function device to act as a gateway between a circuit-switched network and a packet-switched network;
determine that the first interworking function device is unavailable to route the message to the recipient device;
identify a second interworking function device that is associated with the intermediate device based on determining that the first interworking function device is unavailable to route the message to the recipient device,
the second interworking function device to act as the gateway between the circuit-switched network and the packet-switched network;
provide the message to the second interworking function device for routing toward the recipient device; and
receive information indicating that a particular interworking function device has been assigned as a serving mobile switching center of the recipient device, where the particular interworking function device is assigned as the serving mobile switching center of the recipient device based on a detachment and reattachment of the recipient device with regard to a network,
the detachment and reattachment being performed based on the first interworking function device being unavailable to route the message to the recipient device.

8. The non-transitory computer-readable medium of claim 7, where the one or more instructions, when executed by the one or more processors, further cause the one or more processors to:
receive information indicating that the first interworking function device and the second interworking function device are associated with interfaces with the intermediate device; and
where the one or more instructions, that cause the one or more processors to identify the second interworking function device that is associated with the intermediate device, cause the one or more processors to:
identify the second interworking function device based on the information indicating that the first interworking function device and the second interworking function device are associated with interfaces with the intermediate device.

9. The non-transitory computer-readable medium of claim 7, where the one or more instructions, that cause the one or more processors to provide the message to the first interworking function device, cause the one or more processors to:
provide the message to the first interworking function device based on information indicating that the first interworking function device is assigned as the serving mobile switching center of the recipient device.

10. The non-transitory computer-readable medium of claim 7, where the one or more instructions, that cause the one or more processors to receive the information indicating that the particular interworking function device has been assigned as the serving mobile switching center of the recipient device, cause the one or more processors to:
receive the information indicating that the particular interworking function device has been assigned as the serving mobile switching center of the recipient device after the message has been provided to the second interworking function device for routing.

11. The non-transitory computer-readable medium of claim 10, where the particular interworking function device and the second interworking function device are a same interworking function device.

12. The non-transitory computer-readable medium of claim 7, where the one or more instructions, that cause the one or more processors to determine that the first interworking function device is unavailable to route the message to the recipient device, cause the one or more processors to:
determine that the first interworking function device is unavailable to route the message to the recipient device based on failing to receive an acknowledgement from the first interworking function device within a particular time period.

13. A method, comprising:
receiving, by a network device, a message en route to a recipient device;
providing, by the network device, the message to a first interworking function device associated with the recipient device,
the first interworking function device to act as a gateway between a circuit-switched network and a packet-switched network;
determining, by the network device, that the first interworking function device is unavailable to route the message to the recipient device;
identifying, by the network device, a second interworking function device that is capable of routing the message to the recipient device based on determining that the first interworking function device is unavailable to route the message to the recipient device,
the second interworking function device to act as the gateway between the circuit-switched network and the packet-switched network, and
the second interworking function device being identified based on information indicating that the first interworking function device and the second interworking function device are associated with the recipient device;
providing, by the network device, the message to the second interworking function device for routing to the recipient device; and
causing, by the network device, the recipient device to detach from and reattach to a network based on determining that the first interworking function device is unavailable to route the message to the recipient device.

14. The method of claim 13, where identifying the second interworking function device that is capable of routing the message to the recipient device comprises:
identifying the second interworking function device based on information indicating that the second interworking function device has been assigned as a serving mobile switching center of the recipient device,
the second interworking function device being assigned as the serving mobile switching center of the recipient device based on the first interworking function device being unavailable to route the message to the recipient device.

15. The method of claim 13, where causing the recipient device to detach from and reattach to the network comprises:
causing the recipient device to detach from and reattach to the network after the message is provided to the second interworking function device for routing to the recipient device.

16. The method of claim 13, where identifying the second interworking function device that is capable of routing the message to the recipient device comprises:
identifying the second interworking function device based on the first interworking function device and the second interworking function device both being associated with a particular intermediate device via which messages are to be routed to the recipient device.

17. The method of claim 13, where identifying the second interworking function device that is capable of routing the message to the recipient device comprises:
identifying the second interworking function device from a plurality of interworking function devices that are capable of routing the message to the recipient device.

18. The method of claim 13, where determining that the first interworking function device is unavailable to route the message to the recipient device comprises:
determining that the first interworking function device is unavailable to route the message to the recipient device based on failing to receive an acknowledgement from the first interworking function device within a particular time period.

19. The device of claim 1, where the one or more processors, when determining that the first interworking function device is unavailable to route the message to the recipient device, are further to:
determine that the first interworking function device is unavailable to route the message to the recipient device based on failing to receive an acknowledgement from the first interworking function device within a particular time period.

20. The non-transitory computer-readable medium of claim 7, where the one or more instructions, that cause the one or more processors to provide the message to the second interworking function device for routing toward the recipient device, cause the one or more processors to:
provide, to the second interworking function device, an indication that the first interworking function device is unavailable to route the message to the recipient device.

* * * * *